UNITED STATES PATENT OFFICE.

HONORÉ BAYLE, OF NEW YORK, N. Y.

IMPROVEMENT IN COMPOSITIONS FOR MOLDED ARTICLES.

Specification forming part of Letters Patent No. 193,213, dated July 17, 1877; application filed May 2, 1877.

*To all whom it may concern:*

Be it known that I, HONORÉ BAYLE, of the city, county, and State of New York, have invented certain new and useful Improvements in a Composition or Compound for Producing Fancy Articles in Imitation of Wood, of which the following is a specification:

My invention consists essentially in a new composition or compound for manufacturing articles of fancy, such as glove-boxes, powder-boxes, handkerchief-boxes, watch-stands, and other like articles of fancy, in imitation of wood ordinarily called "rustic work."

The composition or compound consists of the following ingredients, to wit: Paper rendered into a plastic mass, commonly called papier-maché, gum-arabic, and powdered bronze, or more properly what is known in commerce as bronze-powder. These ingredients may be employed in the following proportions: To each one hundred (100) pounds of papier-maché I add twenty (20) pounds of gum-arabic and from five (5) to six (6) ounces of bronze-powder. These ingredients are intimately mixed and formed into a homogeneous plastic mass, the gum-arabic having previously been liquefied and boiled with the paper.

The process for manufacturing the articles is as follows: I take a core of the desired shape to form the interior of a box, or whatever other hollow article is to be produced, said core being preferably made of wood and coated with a fatty substance. The composition or compound is then placed around said core, and shaped by hand according to the configuration the hollow article is to have when finished, care being taken that the layer of paste is of equal thickness everywhere as much as possible.

When the article is so prepared, and while yet in a very plastic state, I produce by hand the imitation of the bark by means of a spatula or similar semi-blunt instrument. When so prepared, the article is then placed into a drying oven or kiln, and gradually dried, the temperature being slowly raised to about two hundred and fifty degrees Fahrenheit, (250°.)

When taken out the article has become very hard and tenacious, this baking operation requiring from six to eight hours, and said article is then finished—that is to say, that portion which is to constitute the lid is sawed off from the body. The core is then removed, and such parts of the article requiring different coloring, such as the imitation of moss, are painted over with silver-powder, and those parts in imitation of the wood itself, where cut branches are shown, is painted in the desired or required color. The article is next varnished and lined, and finished in any desired style.

The bronze-powder being added to give a specific color, the amount of this ingredient may therefore vary according to the shade of color it is desired to impart to the article. Other coloring pigments may also be added to the plastic mass or incorporated therewith, when peculiar shades are to be produced.

The operation of manufacturing these objects is very rapid, although the outer part of the article is made by hand; hence, they may be placed upon the market at a very low rate, while at the same time they are very substantial and highly ornamental.

For articles of a higher market value, and where fac-similes of certain wood are desired, the following process is resorted to: I take that part of a branch or limb of a tree, of a size according to the box or article desired, and make therefrom a plaster cast, which I employ as a matrix or mold, in which the article is then molded and finished, as above described.

Of course it will be understood that I do not wish to confine myself to the articles above specified, as it is evident that any article of fancy, capable of being produced by means of a plastic mass or composition, may thus be made.

Having now described my invention, what I claim, and desire to secure by Letters Patent, is—

The composition or compound consisting essentially of papier-maché, gum-arabic, and bronze-powder, with or without the addition of other coloring matter, in or about in the proportions hereinbefore described, for the purpose specified.

In witness that I claim the foregoing I have hereunto set my hand and seal this 21st day of April, 1877.

HONORÉ BAYLE. [L. S.]

Witnesses:
PASCOL RONELLY,
EUGENE CHEVALLIER.